United States Patent
Knopp et al.

(10) Patent No.: US 10,927,738 B2
(45) Date of Patent: Feb. 23, 2021

(54) METHOD FOR REGULATING A FILLING OF AN EXHAUST GAS COMPONENT STORAGE OF A CATALYTIC CONVERTER IN THE EXHAUST GAS OF AN INTERNAL COMBUSTION ENGINE

(71) Applicant: Robert Bosch GmbH, Stuttgart (DE)

(72) Inventors: Martin Knopp, Markgroeningen (DE); Alexandre Wagner, Stuttgart (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/446,214

(22) Filed: Jun. 19, 2019

(65) Prior Publication Data
US 2020/0003096 A1 Jan. 2, 2020

(30) Foreign Application Priority Data
Jun. 29, 2018 (DE) .......................... 102018210739.4

(51) Int. Cl.
*F01N 3/20* (2006.01)
*F01N 9/00* (2006.01)

(52) U.S. Cl.
CPC .............. *F01N 3/206* (2013.01); *F01N 9/005* (2013.01); *F01N 2900/1402* (2013.01); *F02D 2200/0816* (2013.01)

(58) Field of Classification Search
CPC ............ F01N 3/206; F01N 2900/0406; F01N 13/009; F01N 11/007; F01N 2560/025;
(Continued)

(56) References Cited

U.S. PATENT DOCUMENTS 5,901,552 A * 5/1999 Schnaibel ........... F02D 41/1441
60/274
2005/0193721 A1* 9/2005 Surnilla ................ F01N 13/011
60/285
(Continued)

FOREIGN PATENT DOCUMENTS

DE       196 06 652 A1     8/1997
DE     102012215172 A1 *   2/2014      ............ F01N 11/002
(Continued)

*Primary Examiner* — Mahmoud Gimie
*Assistant Examiner* — Joshua Campbell
(74) *Attorney, Agent, or Firm* — Norton Rose Fulbright US LLP; Gerard Messina (57) ABSTRACT

A method for regulating filling an exhaust gas component (EGC) storage of a catalytic converter (CC) in the exhaust gas (EG) of an internal combustion engine. An actual fill level (AFL) of the EGC storage is ascertained using a first system model (FSM), to which signals of a first EG sensor projecting into the EG flow upstream from the CC and detecting a concentration of the EGC and a second EG sensor, downstream from the CC and exposed to the EG, are fed. A base lambda setpoint value for a first control loop (CL) is predefined by a second CL, which is adjusted to the AFL using the AFL ascertained using the FSM when the voltage of the second EG sensor indicates a breakthrough of rich/lean EG downstream from the CC and an excessively low/high AFL of the EGC storage. Also described is a control unit to perform the method.

11 Claims, 6 Drawing Sheets

(58) Field of Classification Search
CPC ..... F01N 2900/1402; F01N 2900/1624; F01N 3/101; F01N 9/00; F01N 9/005; F02D 41/0295; F02D 41/1456; F02D 2200/0814; F02D 2200/0816
USPC ......................................................... 701/102
See application file for complete search history.

(56) References Cited

U.S. PATENT DOCUMENTS

| | | | | |
|---|---|---|---|---|
| 2010/0212291 | A1* | 8/2010 | Schnaibel | F02D 41/0295 |
| | | | | 60/274 |
| 2016/0169077 | A1* | 6/2016 | Srinivasan | F01N 11/007 |

FOREIGN PATENT DOCUMENTS

| | | | | |
|---|---|---|---|---|
| EP | 1052383 | A2 * | 11/2000 | ............. F01N 9/005 |
| EP | 1329627 | A2 * | 7/2003 | ......... F02D 41/0235 |

* cited by examiner

METHOD FOR REGULATING A FILLING OF AN EXHAUST GAS COMPONENT STORAGE OF A CATALYTIC CONVERTER IN THE EXHAUST GAS OF AN INTERNAL COMBUSTION ENGINE

RELATED APPLICATION INFORMATION

The present application claims priority to and the benefit of German patent application no. 10 2018 210 739.4, which was filed in Germany on Jun. 29, 2018, the disclosure of which is incorporated herein by reference.

FIELD OF THE INVENTION

The present invention relates to a method for regulating a filling of an exhaust gas component storage of a catalytic converter in the exhaust gas of an internal combustion engine. In terms of its device aspects, the present invention relates to a control unit.

BACKGROUND INFORMATION

Such a method and such a control unit are each understood for oxygen as the exhaust gas component from DE 196 06 652 B4 of the applicant.

In this method and control unit, an actual fill level of the exhaust gas component storage is ascertained using a first system model, which is fed signals of a first exhaust gas sensor projecting into the exhaust gas flow upstream from the catalytic converter and detecting a concentration of the exhaust gas component, and of a second exhaust gas sensor, which is situated downstream from the catalytic converter and is exposed to the exhaust gas, a base lambda setpoint value for a first control loop being predefined by a second control loop, which then adjusts the actual fill level ascertained by the first system model to the actual fill level, when the voltage of the second exhaust gas sensor indicates a breakthrough of rich or lean exhaust gas downstream from the catalytic converter and, therefore, an excessively low or excessively high actual fill level of the exhaust gas component storage.

During an incomplete combustion of the air-fuel mixture in a gasoline engine, a multitude of combustion products, in addition to nitrogen ($N_2$), carbon dioxide ($CO_2$) and water ($H_2O$), are emitted, of which hydrocarbons (HC), carbon monoxide (CO) and nitrogen oxides ($NO_x$) are limited by law. The applicable exhaust gas limit values for motor vehicles may be complied with according to the present state of the art only with a catalytic exhaust gas after-treatment. By using a three-way catalytic converter, it is possible to convert the aforementioned pollutant components. A simultaneously high conversion rate for HC, CO and $NO_x$ is achieved in the case of three-way catalytic converters only in a narrow lambda range around the stoichiometric operating point (lambda=1), in the so-called conversion window.

To operate the three-way catalytic converter in the conversion window, a lambda regulation is typically used in modern engine control systems, which is based on the signals of lambda sensors situated upstream and downstream from the three-way catalytic converter. To regulate the air ratio lambda, which is a measure of the composition of the fuel/air ratio of the internal combustion engine, the oxygen content of the exhaust gas is measured upstream from the three-way catalytic converter using a front exhaust gas sensor situated there. As a function of this measured value, the regulation corrects the fuel quantity or injection pulse width in the form of a base value predefined by a pilot control function.

As part of the pilot control, base values of fuel quantities to be injected are predefined as a function of, for example, rotational speed and load of the internal combustion engine. For an even more accurate regulation, the oxygen concentration of the exhaust gas downstream from the three-way catalytic converter is also detected using an additional exhaust gas sensor. The signal of this rear exhaust gas sensor is used for a guide regulation, which is superimposed on the lambda regulation based on the signal of the front exhaust gas sensor upstream from the three-way catalytic converter. A jump lambda sensor is generally used as the rear exhaust gas sensor situated downstream from the three-way catalytic converter, which at lambda=1 has a very steep characteristic curve and thus may very accurately indicate lambda=1 (Automotive Handbook, $23^{rd}$ edition, page 524).

In addition to the guide regulation, which generally corrects only small deviations of lambda=1 and is comparatively slowly adapted, there is in general a functionality in present engine control systems, which after large deviations of lambda=1, ensures in the form of a lambda pilot control that the conversion window is quickly achieved again, which is important, for example, after phases with coasting cutoff, in which the three-way catalytic converter is charged with oxygen. The charge with oxygen affects the $NO_x$ conversion.

Due to the oxygen storage capability of the three-way catalytic converter, lambda=1 may still be present for several seconds downstream from the three-way catalytic converter, once a rich or lean lambda has been set upstream from the three-way catalytic converter. This capability of the three-way catalytic converter of temporarily storing oxygen is utilized in order to compensate for short-term deviations of lambda=1 upstream from the three-way catalytic converter. If lambda not equal to 1 is present over a longer period of time upstream from the three-way catalytic converter, the same lambda will also occur downstream from the three-way catalytic converter as soon as the oxygen fill level in the case of a lambda>1 (oxygen surplus) exceeds the oxygen storage capability or, in the case of a lambda<1, as soon as oxygen is no longer stored in the three-way catalytic converter.

At this point in time, a jump lambda sensor downstream from the three-way catalytic converter then also indicates a departure from the conversion window. Up to this point in time, however, the signal of the lambda sensor downstream from the three-way catalytic converter does not indicate the imminent breakthrough, and thus a guide regulation based on this signal often responds so late that the fuel metering is no longer able to respond in time before a breakthrough. As a result of this, increased tailpipe emissions occur. Thus, present regulation concepts have the disadvantage that they only belatedly recognize a departure from the conversion window based on the voltage of the jump lambda sensor downstream from the three-way catalytic converter.

One alternative for the regulation on the basis of the signal of a lambda sensor downstream from the three-way catalytic converter is a regulation of the average oxygen fill level of the three-way catalytic converter. This average fill level is in fact not measurable, but may be modeled by calculations according to the aforementioned DE 196 06 652 B4.

A three-way catalytic converter, however, is a complex non-linear system having time-variant system parameters. In addition, the measured or modeled input variables for a model of the three-way catalytic converter are usually subject to uncertainties. For this reason, a universally accepted catalytic converter model, which is able to sufficiently accurately describe the behavior of the three-way catalytic converter in different operating states (for example, in different engine operating points or in different catalytic converter aging stages), is generally not available in an engine control system.

SUMMARY OF THE INVENTION

The present invention differs from the above-cited related art, in terms of its method aspects, by the characterizing features described herein and, in terms of its device aspects, by the characterizing features of the further features described herein.

The characterizing features described herein provide that a fill level profile is calculated, which would result in the measured signal of the second exhaust gas sensor, and that the fill level profile modeled using the first system model is replaced by the calculated fill level profile.

It is further provided that the adjustment is carried out when the signal of the second exhaust gas sensor enters a signal range, in which a conclusion regarding the actual oxygen fill level of the catalytic converter is possible.

Another embodiment is distinguished by the fact that the catalytic converter is subdivided into zones situated one behind the other with respect to the exhaust gas flowing through it, that the actual fill level in the sub-zone situated furthest downstream is initially calculated based on the signal of the second exhaust gas sensor, that the calculated actual fill level is compared with a fill level modeled for this sub-zone of the catalytic converter, that a correction requirement prevailing at the point in time of the comparison is calculated as the difference between the actual and the modeled fill level, and that the fill level modeled for this sub-zone is corrected using this difference.

It also may be provided that the correction takes place in such a way that all sub-zones are assigned the same fill level.

It also may be provided that the correction requirement determined for the sub-zone of the catalytic converter situated furthest downstream is transferred to the other sub-zones in such a way that that the fill level profile is maintained. This means, in particular, that transitive relations between the fill levels of all sub-zones prevailing prior to the correction are maintained.

It also may be provided that the first system model is numerically inverted in that a second forward system model having identical parameters and initially identical state variables is iterated with variable input lambda until the difference between the modeled lambda downstream from the catalytic converter of this second system model and the lambda measured downstream from the catalytic converter is sufficiently small, in order to achieve the required accuracy of the fill level correction, and that the fill level distribution of the second forward system model is then transferred to the system model, with which it is corrected.

An additional embodiment is distinguished by the fact that a fill level profile, which would result in the measured signal of the second exhaust gas sensor, is calculated with the aid of an inverted system model having identical parameters and initially identical state variables like the system model, and that the fill level profile modeled using the first system model is replaced by the fill level profile calculated using the inverted system model.

It also may be provided that an initial value for the base lambda setpoint value is converted in the second control loop, by a second system model identical to the first system model to a fictitious fill level, that the fictitious fill level is compared with a setpoint value for the fill level output by a setpoint value generator, and that the base lambda setpoint value is iteratively changed as a function of the comparison result if the comparison result indicates a difference between the setpoint value for the fill level and the fictitious level, which is greater than a predefined degree, and that the base lambda setpoint value is not changed if the comparison result indicates no difference between the setpoint value for the fill level and the fictitious fill level.

Another embodiment is distinguished by the fact that when the voltage of the second exhaust gas sensor after a deviation of the modeled fill level from the setpoint value adjusted as a result of a correction of the modeled fill level again indicates a breakthrough of rich or lean exhaust gas downstream from the catalytic converter and, therefore, an excessively low or excessively high actual fill level of the exhaust gas component storage, so that a further correction of the modeled fill level becomes necessary, a lambda correction requirement—$d\lambda$ for the lambda prevailing upstream from the catalytic converter is ascertained based on the entered and discharged quantity of oxygen $K \cdot \int \dot{m}_{air}$ in the catalytic converter following a first correction phase up to a second correction phase, and on a correction requirement $\Delta\theta \cdot OSC$ for the fill level ascertained in an additional correction phase, according to the following equation $$d\lambda = \frac{1}{1 - \frac{\Delta\theta \cdot OSC}{K \cdot \int \dot{m}_{air}}} - 1$$

and the lambda setpoint value formed for the second control loop is corrected using the lambda correction requirement.

It also may be provided that the correction of the lambda setpoint value formed for the second control loop with the lambda correction requirement takes place only when the signal of the second exhaust gas sensor does not leave the signal range within a certain time span after an adjustment of the actual fill level ascertained using the first system model to the actual fill level of the exhaust gas component storage.

It also may be provided that the correction of the lambda setpoint value formed for the second control loop using the lambda correction requirement takes place only when the signal of the second exhaust gas sensor does not leave the signal range within a certain time span after an adjustment of the actual fill level ascertained using the first system model to the actual fill level of the exhaust gas component storage, before the internal combustion engine has not generated a predetermined amount of exhaust gas after the preceding adjustment.

In terms of device aspects, it also may be provided that the control unit is configured to carry out a method as described herein.

Additional advantages result from the description and the appended drawings.

It is understood that the features cited above and those to be explained below are applicable not only in each specified combination, but also in other combinations or alone, without departing from the scope of the present invention.

Exemplary embodiments of the present invention are depicted in the drawings and are explained in greater detail in the following description. In the process, identical reference numerals in various figures each refer to identical elements or elements at least comparable in their function.

The drawings in each case below are in schematic form.

DETAILED DESCRIPTION

The present invention is described below by way of example of a three-way catalytic converter and for oxygen as the exhaust gas component to be stored. However, the present invention is analogously also applicable to other types of catalytic converters and exhaust gas components, such as nitrogen oxides and hydrocarbons. For the sake of simplicity, an exhaust system including a three-way catalytic converter is assumed below. The present invention is analogously also applicable to exhaust systems that include multiple catalytic converters. The front and rear zones described below may extend in this case across multiple catalytic converters or may be situated in different catalytic converters.

Figure 1:
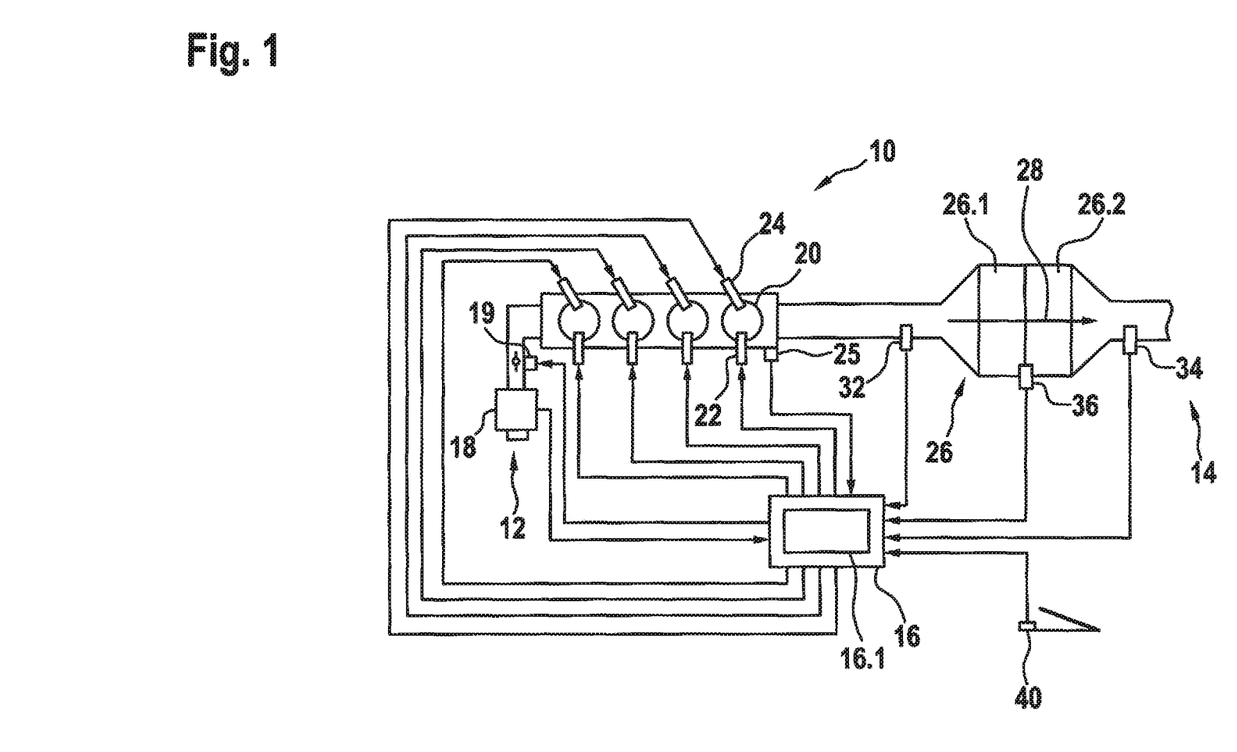
FIG. 1 shows an internal combustion engine, including an exhaust system as the technological backdrop of the present invention.

Specifically, FIG. 1 shows an internal combustion engine 10, including an air supply system 12, an exhaust system 14 and a control unit 16. Located in air supply system 12 is a mass air-flow sensor 18 and a throttle valve of a throttle valve unit 19 situated downstream from mass air-flow sensor 18. The air flowing via air supply system 12 into internal combustion engine 10 is mixed in combustion chambers 20 of internal combustion engine 10 with fuel, which is injected via injectors 22 directly into combustion chambers 20. The present invention is not limited to internal combustion engines having direct injection and may also be used with intake-manifold fuel injection or with gas-driven internal combustion engines. The resulting combustion chamber fillings are ignited and combusted using ignition devices 24, for example, spark plugs. A rotation angle sensor 25 detects the rotation angle of a shaft of internal combustion engine 10 and, as a result, allows control unit 16 to trigger the ignitions in predetermined angular positions of the shaft. The exhaust gas resulting from the combustions is discharged through exhaust system 14.

Exhaust system 14 includes a catalytic converter 26. Catalytic converter 26 is a three-way catalytic converter, for example, which as is well-known converts the three exhaust gas components nitrogen oxides, hydrocarbons and carbon monoxide on three reaction paths, and which has an oxygen storing effect. Due to the oxygen storing effect, and since oxygen is an exhaust gas component, the catalytic converter has an exhaust gas component storage. Three-way catalytic converter 26 in the example depicted includes a first zone 26.1 and a second zone 26.2. Exhaust gas 28 flows through both zones. The first, front zone 26.1 extends in the flow direction across a front section of three-way catalytic converter 26. The second, rear zone 26.2 extends across a rear section of three-way catalytic converter 26 downstream from first zone 26.1. Additional zones may, of course, be situated in front of front zone 26.1 and behind rear zone 26.2, as well as between the two zones, for which, if necessary, the respective fill level is also modeled using a computer model.

A front exhaust gas sensor 32 exposed to exhaust gas 28 upstream from three-way catalytic converter 26 is situated directly upstream from three-way catalytic converter 26. A rear exhaust gas sensor 34 also exposed to exhaust gas 28 downstream from three-way catalytic converter 26 is situated directly downstream from three-way catalytic converter 26. Front exhaust gas sensor 32 may be a broadband lambda sensor, which permits a measurement of the air ratio $\lambda$ across a broad air ratio range. Rear exhaust gas sensor 34 may be a so-called jump lambda sensor, with which air ratio $\lambda=1$ may be particularly accurately measured, because the signal of this exhaust gas sensor 34 abruptly changes there. Cf. Bosch, Automotive Handbook, $23^{rd}$ edition, page 524.

In the exemplary embodiment depicted, a temperature sensor 36 exposed to exhaust gas 28 is situated in thermal contact with exhaust gas 28 on three-way catalytic converter 26, which detects the temperature of three-way catalytic converter 26.

Control unit 16 processes the signals of mass air-flow sensor 18, of rotation angle sensor 25, of front exhaust gas sensor 32, of rear exhaust gas sensor 34 and of temperature sensor 36 and from these forms activation signals for adjusting the angular position of the throttle valve, for triggering ignitions by ignition device 24 and for injecting fuel through injectors 22. Alternatively or in addition, control unit 16 also processes signals of other or additional sensors for activating the actuators depicted or also for additional or other actuators, for example, the signal of a driver input sensor 40, which detects an accelerator pedal position. A coasting with a cutoff of the fuel supply is triggered, for example, by releasing the accelerator pedal. These and the additional functions explained below are carried out by an engine control program 16.1 running in control unit 16 during the operation of internal combustion engine 10.

In this application, reference is made to a system model 100, a catalytic converter model 102, an inverse catalytic converter model 104 (cf. FIG. 3) and an output lambda model 106. Each of the models is an algorithm, in particular, a system of equations, which is carried out or computed in control unit 16 and which link the input variables, which also affect the real object reproduced with the computer model, to the output variables in such a way that the output variables calculated with the algorithms may correspond exactly to the output variables of the real object.

Figure 2:
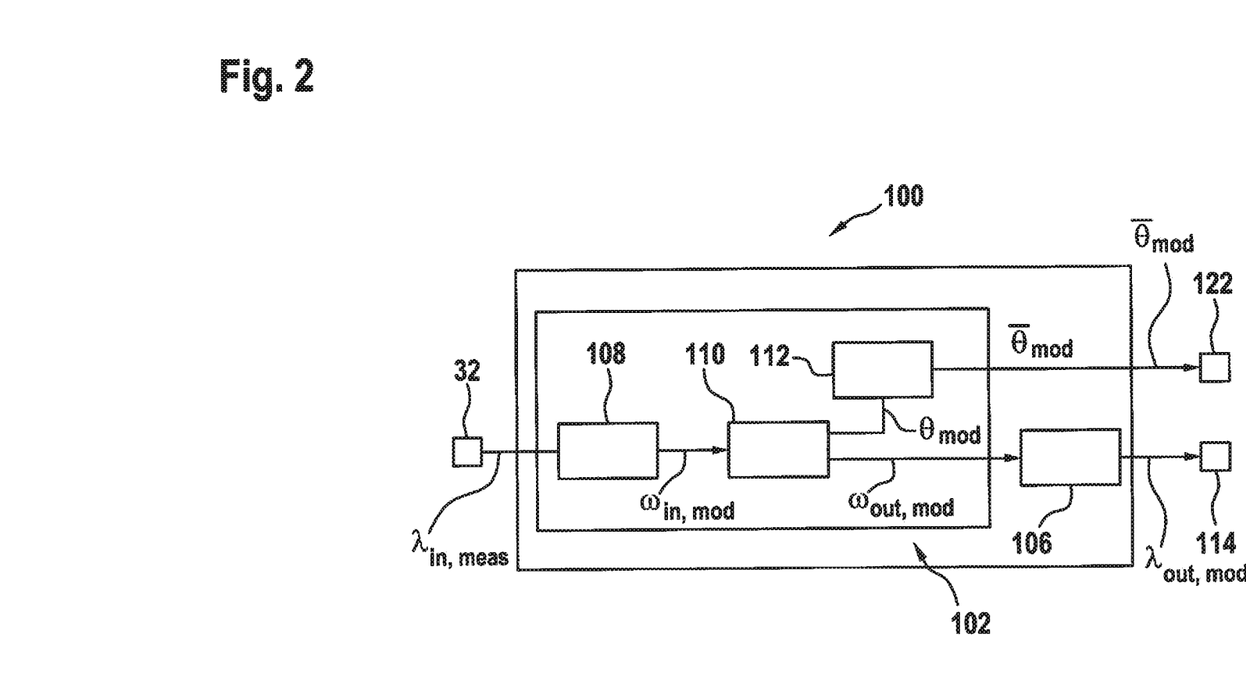
FIG. 2 shows a function block diagram of a system model.

FIG. 2 shows a function block diagram of a system model 100. System model 100 is made up of catalytic converter model 102 and output lambda model 106. Catalytic converter model 102 includes an input emissions model 108 and a fill level and output emissions model 110. Catalytic converter model 102 also includes an algorithm 112 for calculating an average fill level $\overline{\theta}_{mod}$ of catalytic converter 26.

Input emissions model 108 is configured to convert the signal $\lambda_{in,meas}$ of the exhaust gas sensor 32 situated upstream from three-way catalytic converter 26 as the input variable into input variables $w_{in,mod}$ required for the following fill level and output emissions model 110. A conversion of lambda into the concentrations $O_2$, $CO$, $H_2$ and HC upstream from three-way catalytic converter 26 with the aid of input emissions model 108, for example, is advantageous.

Using variables $w_{in,mod}$ calculated by input emissions model 108 and, if necessary, additional input variables (for example, exhaust gas or catalytic converter temperatures, exhaust gas mass flow and instantaneous maximum oxygen storage capability of three-way catalytic converter 26), a fill level $\theta_{mod}$ of three-way catalytic converter 26 and concentrations $w_{out,mod}$ of the individual exhaust gas components at the output of three-way catalytic converter 26 are modeled in fill level and output emissions model 110.

To be able to reproduce filling and emptying processes more realistically, three-way catalytic converter 26 may be subdivided by the algorithm conceptually into multiple zones or sub-volumes 26.1, 26.2 situated one behind the other in the flow direction of exhaust gases 28, and the concentrations of the individual exhaust gas components are ascertained for each of these zones 26.1, 26.2 with the aid of reaction kinetics. These concentrations in turn may each be converted into a fill level of the individual zones 26.1, 26.2, which may be, into the oxygen fill level standardized to the instantaneous maximum oxygen storage capability.

The fill levels of individual zones or of all zones 26.1, 26.2 may be combined to form an overall fill level with the aid of a suitable weighting, which reflects the state of three-way catalytic converter 26. In the simplest case, for example, the fill levels of all zones 26.1, 26.2 may all be weighted equally and an average fill level ascertained as a result. With a suitable weighting, however, it may also be considered that the fill level in a comparatively small zone 26.2 at the output of three-way catalytic converter is decisive for the instantaneous exhaust gas composition downstream from three-way catalytic converter 26, whereas for the development of the fill level in this small zone 26.2 at the output of three-way catalytic converter 26, the fill level in the zone 26.1 situated in front thereof and its development is decisive. For the sake of simplicity, an average oxygen fill level is assumed below.

The algorithm of output lambda model 106 converts the concentrations $w_{out,mod}$ of the individual exhaust gas components at the output of catalytic converter 26 calculated using catalytic converter model 102 for adapting system model 100 into a signal $\lambda_{out,mod}$, which may be compared with signal $\lambda_{out,meas}$ of exhaust gas sensor 34 situated downstream from catalytic converter 26. The lambda downstream from catalytic converter 26 may be modeled. Output lambda model 106 is not absolutely necessary for a pilot control based on a setpoint oxygen fill level.

Thus, system model 100 on the one hand is used to model at least one average fill level $\overline{\theta}_{mod}$ of catalytic converter 26, which is adjusted to a setpoint fill level, in which catalytic converter 26 is reliably located within the catalytic converter window. On the other hand, system model 100 provides a modeled signal $\lambda_{out,mod}$ of exhaust gas sensor 34 situated downstream from catalytic converter 26. It is also explained in greater detail further below how this modeled signal $\lambda_{out,mod}$ of rear exhaust gas sensor 34 is advantageously used for adapting system model 100. The adaptation takes place to compensate for uncertainties to which the input variables of the system model, in particular, the signal of the lambda sensor upstream from the catalytic converter, are subject. The pilot control and, if necessary, the controller parameters are also adapted.

Figure 3:
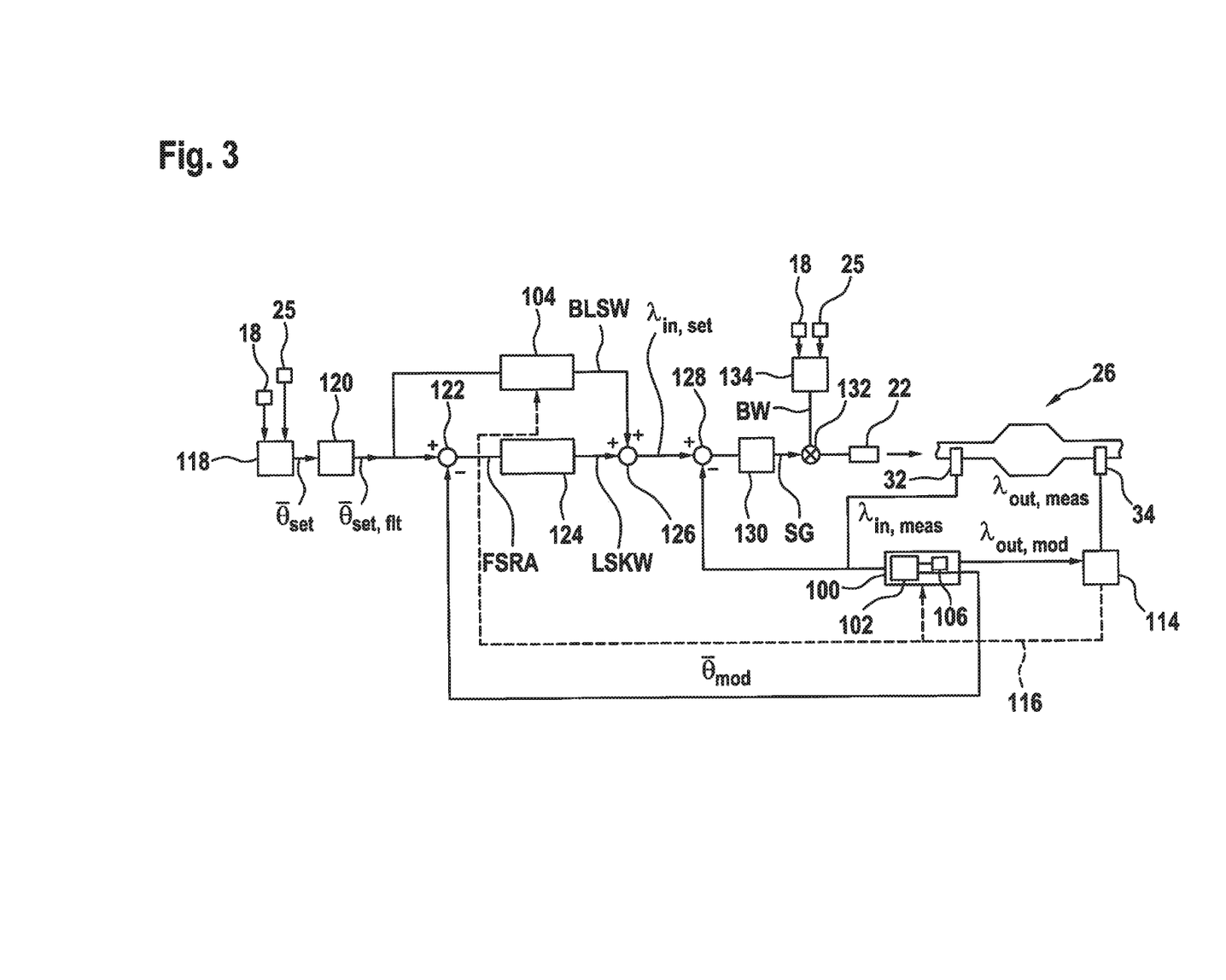
FIG. 3 shows a function block diagram of a part of a method and of a control unit according to the present invention.

FIG. 3 shows as background for the present invention a function block diagram of a method not according to the present invention, together with device elements, which affect the function blocks or which are influenced by the function blocks.

Specifically, FIG. 3 shows how the signal $\lambda_{out,mod}$ of rear exhaust gas sensor 34 modeled by output lambda model 106 is balanced with real output signal $\lambda_{out,meas}$ of rear exhaust gas sensor 34. For this purpose, the two signals $\lambda_{out,mod}$ and $\lambda_{out,meas}$ are fed to an adaptation block 114. Adaptation block 114 compares the two signals $\lambda_{out,mod}$ and $\lambda_{out,meas}$ with one another. For example, a jump lambda sensor as exhaust gas sensor 34 situated downstream from three-way catalytic converter 26 clearly indicates when three-way catalytic converter 26 is completely filled with oxygen or is completely emptied of oxygen. This may be utilized in order to correlate the modeled oxygen fill level with the actual oxygen fill level, or the modeled output lambda $\lambda_{out,mod}$ with the lambda $\lambda_{out,meas}$ measured downstream from three-way catalytic converter 26 after lean phases or rich phases, and to adapt system model 100 in the event of deviations. The adaptation takes place, for example, in that adaptation block 114 successively changes parameters of the algorithm of system model 100 via adaptation path 116 depicted with dashed lines until lambda value $\lambda_{out,mod}$ modeled for the exhaust gas flowing out of three-way catalytic converter 26 corresponds to lambda value $\lambda_{out,meas}$ measured there.

This compensates for inaccuracies in measured variables and model variables, which are incorporated into system model 100. From the fact that modeled value $\lambda_{out,mod}$ corresponds to measured lambda value $\lambda_{out,meas}$, it may be concluded that fill level $\overline{\theta}_{mod}$ modeled using system model 100 or using first catalytic converter model 102 also corresponds to the fill level of three-way catalytic converter 26 not measurable using an on-board arrangement. It may then further be concluded that second catalytic converter model 104 inverse to first catalytic converter model 102, which results from the algorithm of first catalytic converter model 102 via mathematical transformations, also correctly describes the behavior of the modeled system.

This may be used to calculate a base lambda setpoint value using inverse second catalytic converter model 104. For this purpose, a fill level setpoint value $\overline{\theta}_{set,flt}$ filtered by an optional filtering 120 is fed as an input variable to inverse second catalytic converter model 104. Filtering 120 takes place for the purpose of allowing only those changes of the input variables of inverse second catalytic converter model 104, which the control system on the whole is able to follow. A still unfiltered setpoint value $\overline{\theta}_{set}$ in this case is read out of a memory 118 of control unit 16. For this purpose, memory 118 may be addressed using instantaneous operating parameters of internal combustion engine 10. The operating parameters are, for example, but not necessarily, the rotational speed detected by rotational speed sensor 25 and the load of internal combustion engine 10 detected by mass air-flow sensor 18.

The filtered fill level setpoint value $\overline{\theta}_{set,flt}$ is processed using inverse second catalytic converter model 104 to form a base lambda setpoint value BLSW. In parallel with this processing, a fill level control deviation FSRA is formed in a link 122 as a deviation of fill level $\overline{\theta}_{mod}$ modeled using system model 100, or using first catalytic converter model 102, from filtered fill level setpoint value $\overline{\theta}_{set,flt}$. This fill level control deviation FSRA is fed to a fill level control algorithm 124, which forms therefrom a lambda setpoint correction value LSKW. This lambda setpoint correction value LSKW is added in link 126 to the base lambda setpoint value BLSW calculated by inverse system model 104.

The sum thus formed may be used as setpoint value $\lambda_{in,set}$ of a conventional lambda regulation. The lambda actual value $\lambda_{in,meas}$ provided by first exhaust gas sensor 32 is subtracted in a link 128 from this lambda setpoint value $\lambda_{in,set}$. Control deviation RA thus formed is converted via a conventional control algorithm 130 into a manipulated variable SG, which is multiplicatively linked, for example, in a link 132 with a base value BW of an injection pulse width $t_{inj}$ predetermined as a function of operating parameters of internal combustion engine 10. Base values BW are stored in a memory 134 of control unit 16. Here, too, the operating parameters may be, but not necessarily, the load and the rotational speed of internal combustion engine 10. Fuel is injected via injectors 22 into combustion chambers 20 of internal combustion engine 10 with the injection pulse width $t_{inj}$ resulting from the product.

In this way, a regulation of the oxygen fill level of catalytic converter 26 taking place in a second control loop is superimposed on a conventional lambda regulation taking place in a first control loop. In the process, average oxygen fill level $\overline{\theta}_{mod}$ modeled with the aid of system model 100, or with the aid of first catalytic converter model 102, is adjusted, for example, to a setpoint value $\overline{\theta}_{set,flt}$, which minimizes the probability of breakthroughs toward lean and rich and thus results in minimal emissions. Since the base lambda setpoint value BLSW in this case is formed by inverted second system model 104, the control deviation of the fill level regulation is equal to zero if modeled average fill level $\overline{\theta}_{mod}$ is identical to pre-filtered setpoint fill level $\overline{\theta}_{set,flt}$. Fill level control algorithm 124 intervenes only if this is not the case. Since the formation of the base lambda setpoint value acting virtually as a pilot control of the fill level regulation is implemented as inverted second catalytic converter model 104 of first catalytic converter model 102, this pilot control may be adapted by analogy with the adaption of first catalytic converter model 102 on the basis of signal $\lambda_{in,meas}$ of second exhaust gas sensor 34 situated downstream from three-way catalytic converter 26. This is illustrated in FIG. 3 by the branch of adaption path 116 leading to inverted system model 104.

This implementation of the pilot control as an inversion of the system model has the advantage that fill level control algorithm 124 need only intervene if the actual fill level of the catalytic converter modeled with the aid of the system model deviates from filtered fill level setpoint value $\overline{\theta}_{set,flt}$ or from unfiltered fill level setpoint value $\overline{\theta}_{set}$. While system model 100 converts the input lambda upstream from the catalytic converter into an average oxygen fill level of the catalytic converter, the pilot control implemented as inverted system model 104 converts the average setpoint oxygen fill level into a corresponding setpoint lambda upstream from the catalytic converter.

In the subject matter of FIG. 3, inverted system model 104 is present as an analytical element, i.e., an element present in the form of an equation system and inverse to system model 100. A catalytic converter, however, is a complex, non-linear system having time-variant system parameters, which generally may only be represented by a non-linear differential equation system. The result of this, typically, is that the equation system for inverted system model 104 cannot be solved analytically.

Figure 4:
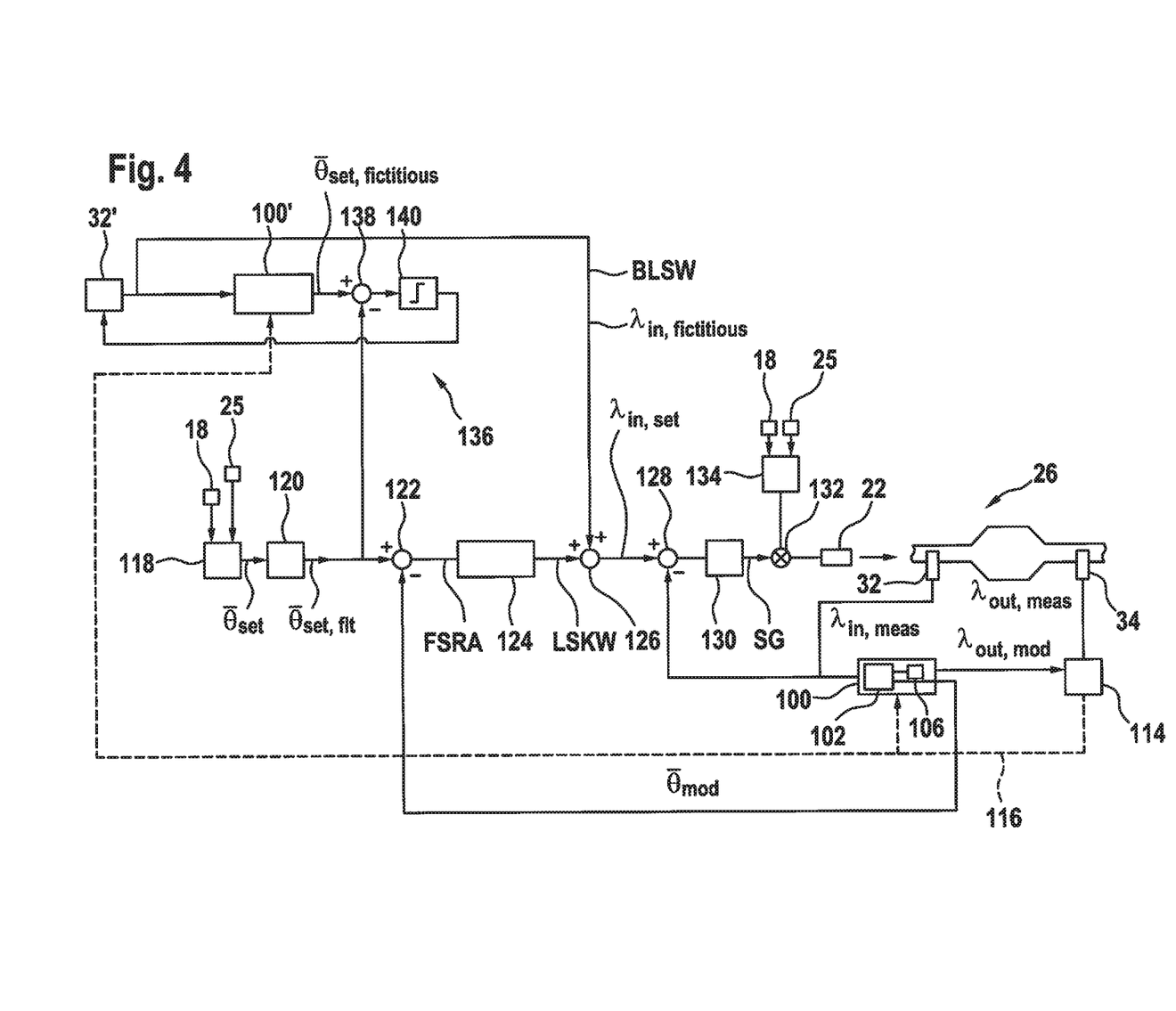
FIG. 4 shows a function block diagram of one exemplary embodiment of a method and control unit according to the present invention.

FIG. 4 shows an exemplary embodiment of the present invention in the form of a function block diagram. In this exemplary embodiment, the solvability problems of the subject matter of FIG. 3 are avoided. The subject matter of FIG. 4 differs from the subject matter of FIG. 3 in that a pilot control 136 is replaced not by an analytical, inverted system model 104, but by a numerically inverted mathematical model, which is based on an assumed to be known first system model 100 for catalytic converter 26. Pilot control 136 includes a second system model 100', the equation system of which is identical to the equation system of first system model 100, but is fed with other input variables. The configuration and the functions of the remaining blocks of FIG. 4 are otherwise each identical to the configuration and the functions of the identically numbered blocks from FIG. 3. For an explanation of these blocks and their configuration, explicit reference is made herewith to the description of FIG. 3.

The subject matter of FIG. 4 is based on the following consideration. A fictitious value $\lambda_{in,fictitious}$ is predefined using a lambda actual value sensor block 32' as an input variable for second system model 100' of pilot control 136. Using second system model 100', a fictitious value $\overline{\theta}_{set,fictitious}$ for the average oxygen fill level of catalytic converter 26 results from this input variable. In link 138, the difference is calculated from fictitious average fill level $\overline{\theta}_{set,fictitious}$ and fill level setpoint value $\overline{\theta}_{set,flt}$ filtered via optional filtering 120 or unfiltered fill level setpoint value $\overline{\theta}_{set}$. If both values $\overline{\theta}_{set,fictitious}$ and $\overline{\theta}_{set,flt}$ (or $\overline{\theta}_{set}$) are identical, the difference is equal to zero. This means that predefined fictitious lamba value $\lambda_{in,fictitious}$ corresponds exactly to lambda setpoint value BLSW, which must be pilot-controlled in order to achieve the setpoint oxygen fill level. In threshold value block 140, the difference between fictitious average fill level $\overline{\theta}_{set,fictitious}$ and fill level setpoint value $\overline{\theta}_{set,flt}$ filtered by optional filtering 120 or unfiltered fill level setpoint value $\overline{\theta}_{set}$ is compared with a predefined threshold value. If the degree of difference is sufficiently small, which is adjustable via the choice of the variable of the threshold value, then threshold value block 140 supplies lambda actual value sensor block 32' with a signal representing this fact. In response to this signal, lambda actual value sensor block 32' retains its output signal $\lambda_{in,fictitious}$ thus recognized as accurate and transfers this signal to link 126 as base lambda setpoint value BLSW.

If the difference in the value calculated from fictitious average fill level $\overline{\theta}_{set,fictitious}$ and fill level setpoint value $\overline{\theta}_{set,flt}$ filtered by optional filtering 120 or unfiltered fill level setpoint value $\overline{\theta}_{set}$ on the other hand is greater than the threshold value, this means that predefined fictitious lambda value $\lambda_{in,fictitious}$ does not yet correspond to ideal lambda setpoint value BLSW, which must be pilot controlled in order to achieve the setpoint oxygen fill level. In threshold value block 140, the difference between fictitious average fill level $\overline{\theta}_{set,fictitious}$ and fill level setpoint value $\overline{\theta}_{set,flt}$ filtered by optional filtering 120 or unfiltered fill level setpoint value $\overline{\theta}_{set}$ will then exceed the predefined threshold value. In this case, threshold value block 140 supplies a signal to lambda actual value sensor block 32' representing this fact. In response to this signal, lambda actual value sensor block 32' starts to iteratively vary its output signal $\lambda_{in,fictitious}$ thus recognized as inaccurate and transfers the iteratively varying output signal $\lambda_{in,fictitious}$ in particular, to system model 100'. This second system model 100', with respect to first system model 100, is then iterated with identical parameters and initially identical state variables as first system model 100 with variable input lambda $\lambda_{in,fictitious}$ until the difference between fill level $\overline{\theta}_{set,fictitious}$ calculated by second system model 100' and filtered fill level setpoint value $\overline{\theta}_{set,flt}$ or unfiltered fill level setpoint value $\overline{\theta}_{set}$ is sufficiently small in degree in order to achieve the required accuracy of the pilot control. The required accuracy is adjustable by the choice of the threshold value in block 140. The value thus found for input lambda $\lambda_{in,fictitious}$ is then used as base lambda setpoint value BLSW for the first control loop. The difference formation represents merely one embodiment of a comparison of fictitious average fill level $\overline{\theta}_{set,fictitious}$ with fill level setpoint value $\overline{\theta}_{set,flt}$ filtered by optional filtering 120 or unfiltered fill level setpoint value $\overline{\theta}_{set}$. A comparison may also be made, for example, on the basis of a quotient formation.

The advantage of this approach is that merely the equation system for forward system model 100, or 100' need be solved one more time, not however, the equation system for backward system model 104 from FIG. 3, solvable only with significant computing effort or insolvable.

To minimize the computing effort in control unit 16, iteration limits may be established for input lambda $\lambda_{in,fictitious}$ which determine the range, in which the iteration is carried out. These iteration limits may be established as a function of the instantaneous operating conditions. It is advantageous, for example, to carry out the iteration only in what may be a small interval to obtain setpoint lambda BLSW to be expected. It is further advantageous when establishing the iteration limits to take into consideration the intervention of fill level regulation 124 and interventions of other functionalities in setpoint lambda BLSW.

The equation system to be solved is solved iteratively within this interval using inclusion methods such as, for example, bisection methods or false position methods. Inclusion methods, such as the false position methods are generally known. They are distinguished by the fact that they not only supply iterative approximate values, but that they also limit these from both sides. The computing effort for determining the correct base lambda setpoint value BLSW is significantly limited as a result.

The specific pilot control 136 of FIG. 4 replaces inverted system model 104 from FIG. 3. An equivalent adaption of the pilot control with respect to its technical effect for adapting inverted system model 104 from FIG. 3 takes place in the subject matter of FIG. 4 via path 116 leading from block 114 to second system model 100'.

All elements depicted in FIG. 4, with the exception of exhaust system 26, of exhaust gas sensors 32, 34, of mass air-flow sensor 18, of rotation angle sensor 25 and of injectors 22, are components of a control unit 16 according to the present invention. All remaining elements from FIG. 4, with the exception of memories 118, 134, are parts of engine control program 16.1, which is stored and runs in control unit 16.

Elements 22, 32, 128, 130 and 132 form the first control loop, in which a lambda regulation takes place, in which signal $\lambda_{in,meas}$ of first exhaust gas sensor 32 is processed as the lambda actual value. Lambda setpoint value $\lambda_{in,set}$ of the first control loop is formed in the second control loop, which includes elements 22, 32, 100, 122, 124, 126, 128, 132.

Figure 5:
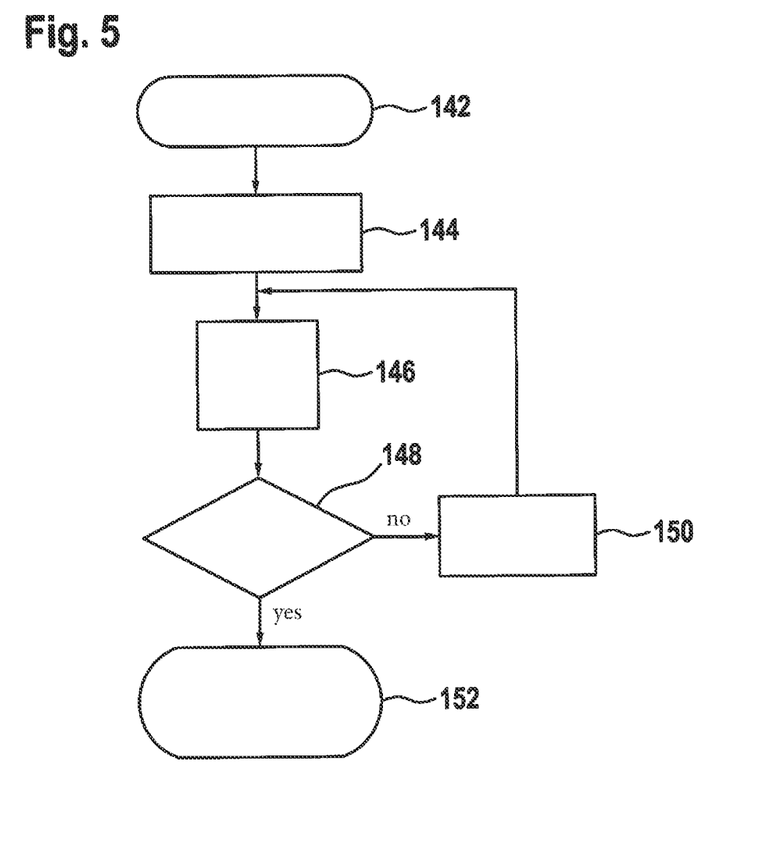
FIG. 5 shows a flow chart as an exemplary embodiment of a part of a method according to the present invention.

FIG. 5 shows a flow chart as an exemplary embodiment of a method for carrying out the pilot control explained with respect to FIG. 4. The flow chart may be carried out as a sub-program of engine control program 16.1 from FIG. 1.

In step 142, the sub-program is called up from superior parts of engine control program 16.1. In step 144, an initial value of fictitious lambda value $\lambda_{in,fictitious}$ is predefined. Based on this, fictitious value $\overline{\theta}_{set,fictitious}$ for the average oxygen fill level of the catalytic converter is calculated in step 146 using the equations of system model 100' (which are identical to the equations of system model 100). In step 148, the difference between fictitious average fill level $\overline{\theta}_{set,fictitious}$ and filtered fill level setpoint value $\theta_{set,flt}$ or unfiltered fill level setpoint value $\overline{\theta}_{set}$ is calculated and compared with a predefinable threshold value. If the difference is greater than the threshold value, an iterative change of fictitious lambda value $\lambda_{in,fictitious}$ and a branching take place in step 150 prior to step 146. The loop from steps 146, 148 and 150 is passed through repeatedly, if necessary, a change of fictitious lambda value $\lambda_{in,fictitious}$ taking place with each passage in step 150. If in step 150 the difference between fictitious average fill level $\overline{\theta}_{set,fictitious}$ and filtered fill level setpoint value $\theta_{set,flt}$ is smaller than the threshold value, then no further change of fictitious lambda value $\lambda_{in,fictitious}$ takes place in this execution of the sub-program, and the sub-program branches in step 152, in which fictitious lambda value $\lambda_{in,fictitious}$ ascertained up to this point is used as base lambda setpoint value BLSW.

Figure 6:
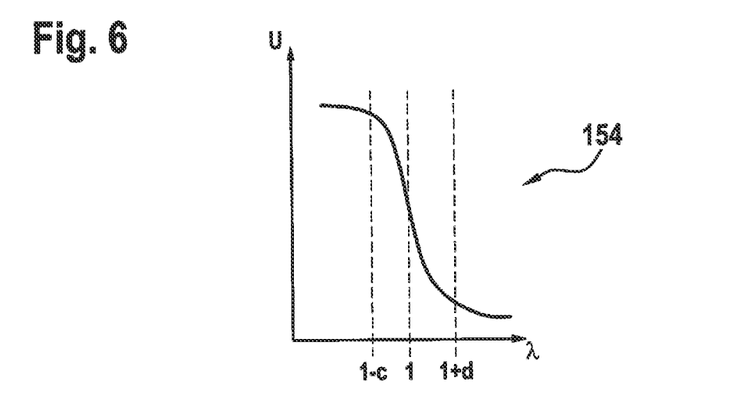
FIG. 6 shows a characteristic curve or the signal of a second exhaust gas sensor situated downstream from the catalytic converter.

FIG. 6 qualitatively shows characteristic curve 154, or the signal of a second exhaust gas sensor 34 situated downstream from the catalytic converter. Lambda values are plotted on the x-axis and associated voltage values are plotted on the y-axis. Second exhaust gas sensor 34 exhibits a steep curve at lambda equals 1, which allows for an exact detection of the lambda value in a narrow setting around value 1. A range of lambda values that are smaller than 1−c, represents an oxygen deficiency, and a range of lambda values 1+d represents an oxygen surplus. The values of c and d may be greater than 0.1.

If exhaust gas sensor 34 situated downstream from catalytic converter 26 clearly indicates a high voltage, i.e., the associated lambda is smaller than 1−c, this means that the rear zone of catalytic converter 26.2 of catalytic converter 26 is freed of oxygen to the extent that rich exhaust gas breaks through. The higher the sensor voltage is, the lower is the actual oxygen fill level.

If second exhaust gas sensor 34 downstream from catalytic converter 26 clearly indicates a low voltage, this means that the rear zone of catalytic converter 26 is filled with oxygen to the extent that lean exhaust gas breaks through. The lower the sensor voltage is, conversely, the higher is the actual oxygen fill level.

When the voltage of second exhaust gas voltage 34 indicates a breakthrough of rich or lean exhaust gas and, therefore, an excessively low or an excessively high actual oxygen fill level, it is provided to then correct the modeled oxygen fill level accordingly.

Figure 7:
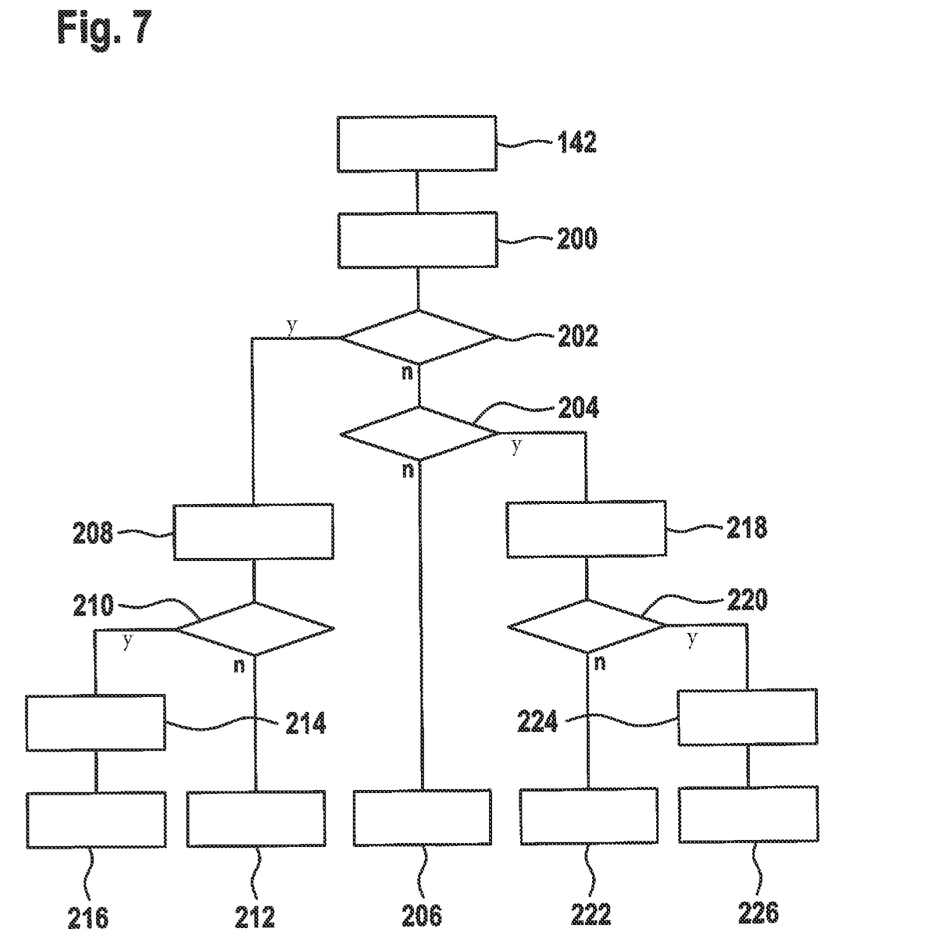
FIG. 7 shows a flow chart as an exemplary embodiment of a method according to the present invention.

FIG. 7 shows a flow chart as an exemplary embodiment of a method according to the present invention. From step 142 which, as in FIG. 5, represents a main program for controlling internal combustion engine 10, a step 200 is repeatedly achieved in a predetermined manner, in which the fill level of catalytic converter 26 is determined using first system model 100. In a step 202 following step 200, the signal of second exhaust gas sensor 34 is checked in terms of whether it indicates a clear oxygen deficiency. A clear oxygen deficiency prevails when lambda is smaller than 1−c. If this is not the case, the program is continued with step 204, with which it is checked whether the signal of second exhaust gas sensor 34 indicates a clear oxygen surplus. A clear oxygen surplus prevails when the signal of second exhaust gas sensor 34 is greater than 1+d. If this is not the case, the method is continued in step 206. Step 206 represents main program 142 with a fill level for catalytic converter 26, which results from first system model 100. To a certain extent, this represents the normal case, in which the fill level calculated using system model 100 largely corresponds to the actual fill level.

If, on the other hand, it is established in step 202 that an oxygen deficiency prevails downstream from catalytic converter 26, the program branches into step 208, in which the value of the oxygen fill level calculated in system model 100 is set to a comparatively low value, which typically correlates with an oxygen deficiency downstream from catalytic converter 26. System model 100 is corrected accordingly on the basis of the signal of second exhaust gas sensor 34 and, therefore, the modeled fill level is adjusted to the actual fill level.

A correction of the modeled fill level as in step 208 results in a deviation of the modeled fill level from the setpoint value. This deviation is subsequently corrected. It results in an adjustment of the air-fuel mixture in the direction of the setpoint value of the fill level regulation and moves the fill level of catalytic converter 26 in the direction of the catalytic converter window, i.e., to an average fill level.

After such a correction phase, i.e., once the control deviation occurring as a result of the correction is corrected, catalytic converter 26 should again be located in the catalytic converter window and should also remain there as a result of the regulation—provided that the uncertainties of the measured variables or model variables are incorporated into system model 100, and the modeling inaccuracies are sufficiently minimal. If this is not the case, the catalytic converter window is vacated again after a certain period of time in spite of the regulation, because the modeled fill level that is corrected does not correspond to the actual fill level, so that a further correction of the modeled fill level becomes necessary.

In step 210, it is checked whether a minimum time span has elapsed since the last correction in step 208, or whether the internal combustion engine has since then produced a certain minimum quantity of exhaust gas. If this is not the case, the main program is initially continued in step 212 with the fill level corrected in step 208.

If, on the other hand, the query in step 210 is answered with yes, this indicates that the calculation of the fill level by system model 100 includes a systematic deviation, which quickly results in a new correction requirement. This may occur if a parameter of the model-based regulation of catalytic converter 26 exhibits an offset, which results in a systematically excessively high modeled oxygen fill level. In this case, the quantity of oxygen $K \cdot \int \dot{m}\_air$ entered into or discharged out of catalytic converter 26 between the last two equation steps 208 and the correction requirement $\Delta\theta \cdot OSC$ for the fill level is ascertained in step 214 in the second correction phase. In this case, $\Delta\theta$ is a number between $-1$ and $1$ and OSC is the maximum oxygen storage capacity of catalytic converter 26. Based on these values, it is possible to calculate a lambda correction using the formula $$d\lambda = \frac{1}{1 - \frac{\Delta\theta \cdot OSC}{K \cdot \int \dot{m}_{air}}} - 1$$

with which the offset is compensated for in the formation of the lambda setpoint value for the first control loop. The main program is subsequently continued in step 216 with the new values for the oxygen fill level and with the lambda setpoint value correction.

If, on the other hand, it is established in step 204 that an oxygen surplus prevails downstream from catalytic converter 26, the program branches into step 218, in which the value of the oxygen fill level calculated in system model 100 is set to a comparatively high value, which typically correlates with an oxygen surplus downstream from catalytic converter 26. System model 100 is accordingly corrected on the basis of the signal of the second exhaust gas sensor 34 and, therefore, the modeled fill level is adjusted to the actual fill level.

Here, too, it is the case that a correction of the modeled fill level, as it takes place in step 218, results in a deviation of the modeled fill level from the setpoint value, which is corrected, and which results in an adjustment of the air-fuel mixture in the direction of the setpoint value of the fill level regulation, and thus moves the fill level in the direction of an average value.

It is also the case here that the fill level of catalytic converter 26 after the correction of the control deviation generated by the correction is again situated at an average value and should remain there due to the regulation. If the uncertainties of measured variables or model variables incorporated into the system model and the model inaccuracies are not minimal enough, the average fill level and, therefore the catalytic converter window is again vacated after a certain period of time in spite of the regulation, because the modeled fill level does not correspond to the actual fill level. A further correction of the modeled fill level then becomes necessary.

In step 220, it is checked whether a certain minimum time span has elapsed since the last correction that took place in step 218, or whether the internal combustion engine has since then produced a certain minimum quantity of exhaust gas. If this is the case, the main program is continued in step 222 with the fill level corrected in step 218. If, on the other hand, the query is answered in step 220 with yes, this indicates that the calculation of the fill level by system model 100 includes a systematic deviation, which quickly results in a new correction requirement. This may occur if a parameter of the model-based regulation of catalytic converter 26 exhibits an offset, which results in a systematically excessively high or excessively low modeled oxygen fill level. In this case, the quantity of oxygen $K \cdot \int \dot{m}_{air}$ entered into and discharged out of catalytic converter 26 between the last two equation steps 218 and the correction requirement $\Delta\theta \cdot OSC$ for the fill level is ascertained in step 224 in the second correction phase. In this case, $\Delta\theta$ is a number between $-1$ and $1$ and OSC is the maximum oxygen storage capacity of catalytic converter 26. Based on these values, it is possible to calculate a lambda correction using the formula $$d\lambda = \frac{1}{1 - \frac{\Delta\theta \cdot OSC}{K \cdot \int \dot{m}_{air}}} - 1$$

with which the offset is compensated for in the formation of the lambda setpoint value for the first control loop. The main program is subsequently continued in step 226 with the new values for the oxygen fill level and with the lambda setpoint value correction.

In this way, the modeled fill level is accordingly corrected to the actual fill level in steps 208 and 218 when the voltage of exhaust gas sensor 34 indicates a breakthrough of rich or lean exhaust gas downstream from catalytic converter 26 and, therefore, an excessively low or an excessively high actual oxygen fill level. This correction takes place discontinuously, in order to be able to assess the response of the voltage of the lambda sensor downstream from the catalytic converter. Since this response is delayed due to the system downtime and to the storage behavior of the catalytic converter, it is provided to carry out the correction initially one time when the lambda value of the signal of second exhaust gas sensor 34 enters the range 1−c or 1+d, in which a conclusion regarding the actual oxygen fill level of the catalytic converter is possible.

The correction of the modeled fill level, as it takes place in steps 208 and 218, may be carried out in a variety of ways.

The correction may take place in such a way that the actual oxygen fill level in a rear sub-zone 26.2 of catalytic converter 26 is initially calculated from the signal of second exhaust gas sensor 34, for example, with the aid of aforementioned characteristic curve 154 for the relationship between sensor voltage and oxygen fill level. The actual fill level thus ascertained is compared with the modeled fill level in the rear sub-zone 26.2 of catalytic converter 26. The difference between the actual fill level and the modeled fill level represents the correction requirement at the point in time of the comparison. With this correction requirement, at least the modeled fill level in the rear zone 26.2 of catalytic converter 26 is corrected.

However, if a correction requirement exists in rear sub-zone 26.2 of catalytic converter 26, it is to be assumed, that a deviation between the modeled fill level and the actual fill level also exists in sub-zones 26.1 of catalytic converter 26 situated further forward. For this reason, it is advantageous to also correct the modeled fill levels in one or in multiple sub-zones 26.1 situated further forward. In a first embodiment, the correction takes place on the basis of the signal of second exhaust gas sensor 34 in such a way that all sub-zones 26.1, 26.2 of catalytic converter 26 are assigned the same fill level. In a second embodiment, the correction takes place in such a way that a potentially present fill level profile, i.e., different fill levels in sub-zones 26.1, 26.2 different from one another, is maintained. If, for example, a correction requirement of 20% has been ascertained in the filling direction the rear sub-zone 26.2 of catalytic converter 26, it is advantageous to add this 20% both to the modelled fill level in rear sub-zone 26.2 of catalytic converter 26, as well as to the modelled fill levels in sub-zones 26.1 situated further forward—it being self-evident that the modeled fill levels of the individual sub-zones are limited to values between 0% and 100%. Compared to the simple correction, in which the modeled fill level of all sub-zones of catalytic converter 26 is set to the same value, this type of correction has the advantage that the modeled fill level profile is taken into account immediately before the correction and is maintained. Alternatively, a weighting of the correction requirement in sub-zones 26.1 of catalytic converter 26 situated further forward would also be conceivable, for example.

A particularly advantageous implementation of the fill level correction is the model-based correction. In this case, it is provided to calculate the fill level profile with the aid of an inverted system model 104 (cf. FIG. 3) having identical parameters and initially identical state variables like system model 100, which would result in the measured signal of second exhaust gas sensor 34.

System model 100 may be analytically inverted. A catalytic converter 100, however, is a complex, non-linear system having time-variant system parameters, which generally may only be represented by a non-linear differential equation system. The result of this, typically, is that the equation system for inverted system model 104 cannot be solved analytically.

For this reason, a numerical inversion of system model 100 is provided as an alternative to the analytical inversion of system model 100: A second forward system model 100' (cf. FIG. 5) having identical parameters and initially identical state variables is iterated with variable input lambda until the difference between the modeled lambda downstream from catalytic converter 26 of this second system model 100' and the lambda measured downstream from catalytic converter 26 is sufficiently minimal in order to achieve the required accuracy of the fill level correction. The fill level distribution of second forward system model 100' is then transferred to system model 100, with which it is corrected.

What is claimed is:

1. A method for regulating a filling of an exhaust gas component storage of a catalytic converter in an exhaust gas of an internal combustion engine, the method comprising:
   ascertaining an actual oxygen fill level of the exhaust gas component storage using a first system model, the catalytic converter being subdivided into zones situated one behind the other with respect to the exhaust gas flowing through the catalytic converter, each of the sub-zones having a respective oxygen fill level, the first system model modeling a fill level profile of the catalytic converter, the fill level profile including each of the respective oxygen fill levels of each of the sub-zones separately, the ascertaining including feeding as input to the first system model signals of a first exhaust gas sensor projecting into the exhaust gas flow upstream from the catalytic converter and detecting a concentration of the exhaust gas component, and of a second exhaust gas sensor, which is situated downstream from the catalytic converter and is exposed to the exhaust gas, wherein a base lambda setpoint value for a first control loop is predefined by a second control loop;
   adapting the actual oxygen fill level ascertained using the first system model when a voltage of the second exhaust gas sensor indicates a breakthrough of rich or lean exhaust gas downstream from the catalytic converter and an excessively low or excessively high actual oxygen fill level of the exhaust gas component storage;
   wherein the adapting of the actual oxygen fill level ascertained using the first system model includes: (i) calculating a new fill level profile of the catalytic converter using the signal of the second exhaust gas sensor, and (ii) replacing the fill level profile modeled by the first system model with the calculated fill level profile; and
   ascertaining the actual oxygen fill level of the exhaust gas component storage using the first system model which now models the calculated fill level profile;
   wherein the calculating of the new fill level profile of the catalytic converter includes calculating the new fill level profile using a second system model; and
   wherein the second system model is a second forward system model having identical parameters and initially identical state variables as the first system model.

2. The method of claim 1, wherein the adjustment is performed when the signal of the second exhaust gas sensor enters a signal range, in which a conclusion regarding the actual oxygen fill level of the catalytic converter is possible.

3. The method of claim 1, wherein calculating of the new fill level profile includes iterating, with variable input lambda, the second forward system model having the identical parameters and initially identical state variables, the iterating being performed until a difference between a modeled lambda output by the second forward system model and a lambda measured downstream from the catalytic converter using the second exhaust sensor is sufficiently minimal, to achieve a required accuracy of oxygen fill level correction, and an oxygen fill level distribution of the second forward system model is then transferred to the first system model, with which it is corrected.

4. The method of claim 1, wherein in the second control loop, an initial fictitious lamba value for the base lambda setpoint value is converted into a fictitious oxygen fill level by the second system model, the fictitious oxygen fill level being compared with a setpoint value for an oxygen fill level output by a setpoint generator, and the base lambda setpoint value being iteratively changed as a function of the comparison result, if the comparison result indicates a difference between the setpoint value for the oxygen fill level and the fictitious oxygen fill level, which is greater than a predefined degree, and the base lambda setpoint value not being changed if the comparison result indicates no difference between the setpoint value for the oxygen fill level and the fictitious oxygen fill level.

5. The method of claim 1, wherein when the voltage of the second exhaust gas sensor indicates, after the fill level profile modeled by the first system model has been replaced, a breakthrough of rich or lean exhaust gas downstream from the catalytic converter and, therefore, an excessively low or excessively high actual oxygen fill level of the exhaust gas component storage, so that a further correction of the oxygen fill level modeled by the first system model becomes necessary, a lambda correction requirement of $d\Delta$ for a lambda prevailing upstream from the catalytic converter is ascertained based on entered and discharged quantity of oxygen $K \cdot \int \dot{m}_{air}$ in the catalytic converter following a first correction phase up to a second correction phase, and on a correction requirement $\Delta\theta \cdot OSC$ for an oxygen fill level ascertained in an additional correction phase, according to the following equation $$d\lambda = \frac{1}{1 - \frac{\Delta\theta \cdot OSC}{K \cdot \int \dot{m}_{air}}} - 1$$

and the base lambda setpoint value formed by the second control loop is corrected using the lambda correction requirement.

6. The method of claim 5, wherein the correction of the lambda setpoint value formed for the second control loop using the lambda correction requirement occurs only when the signal of the second exhaust gas sensor does not leave the signal range within a certain time span after an adjustment of the actual oxygen fill level ascertained using the first system model to the actual oxygen fill level of the exhaust gas component storage.

7. The method of claim 5, wherein the correction of the lambda setpoint value formed for the second control loop using the lambda correction requirement occurs only when the signal of the second exhaust gas sensor does not leave the signal range within a certain time span after an adjustment of the actual oxygen fill level ascertained using the first system model to the actual oxygen fill level of the exhaust gas component storage, before the internal combustion engine has not generated a predetermined amount of exhaust gas after the preceding adjustment.

8. A control unit to regulate a filling of an exhaust gas component storage of a catalytic converter in the exhaust gas of an internal combustion engine, comprising:
a controller configured to ascertain an actual oxygen fill level of the exhaust gas component storage using a first system model, the catalytic converter being subdivided into zones situated one behind the other with respect to the exhaust gas flowing through the catalytic converter, each of the sub-zones having a respective oxygen fill level, the first system model modeling a fill level profile of the catalytic converter, the fill level profile including each of the respective oxygen fill levels of each of the sub-zones separately, the controller being further configured to process signals of a first exhaust gas sensor projecting into the exhaust gas flow upstream from the catalytic converter and detect a concentration of the exhaust gas component, and of a second exhaust gas sensor, which is situated downstream from the catalytic converter and is exposed to the exhaust gas, to predefine a base lambda setpoint value for a first control loop via a second control loop, and to adjust the actual oxygen fill level ascertained using the first system model when the voltage of the second exhaust gas sensor indicates a breakthrough of rich or lean exhaust gas downstream from the catalytic converter and an excessively low or excessively high actual oxygen fill level of the exhaust gas component storage;
wherein the controller adjusts the actual oxygen fill level ascertained using the first system model by (i) calculating a new fill level profile of the catalytic converter using the signal of the second exhaust gas sensor, and (ii) replacing the fill level profile modeled by the first system model with the calculated fill level profile, and wherein the controller is configured to ascertain the actual oxygen fill level of the exhaust gas component storage using the first system model which now models the calculated fill level profile;
wherein the calculating of the new fill level profile of the catalytic converter includes calculating the new fill level profile using a second system model; and
wherein the second system model is a second forward system model having identical parameters and initially identical state variables as the first system model.

9. The control unit of claim 8, wherein the adjustment is performed when the signal of the second exhaust gas sensor enters a signal range, in which a conclusion regarding the actual oxygen fill level of the catalytic converter is possible.

10. A method for regulating a filling of an exhaust gas component storage of a catalytic converter in an exhaust gas of an internal combustion engine, the method comprising:
ascertaining an actual oxygen fill level of the exhaust gas component storage using a first system model, the catalytic converter being subdivided into zones situated one behind the other with respect to the exhaust gas flowing through the catalytic converter, each of the sub-zones having a respective oxygen fill level, the first system model modeling a fill level profile of the catalytic converter, the fill level profile including each of the respective oxygen fill levels of each of the sub-zones separately, the ascertaining including feeding as input to the first system model signals of a first exhaust gas sensor projecting into the exhaust gas flow upstream from the catalytic converter and detecting a concentration of the exhaust gas component, and of a second exhaust gas sensor, which is situated downstream from the catalytic converter and is exposed to the exhaust gas, wherein a base lambda setpoint value for a first control loop is predefined by a second control loop;
adapting the actual oxygen fill level ascertained using the first system model when a voltage of the second exhaust gas sensor indicates a breakthrough of rich or lean exhaust gas downstream from the catalytic converter and an excessively low or excessively high actual oxygen fill level of the exhaust gas component storage;

wherein the adapting of the actual oxygen fill level ascertained using the first system model includes: (i) calculating a new fill level profile of the catalytic converter using the signal of the second exhaust gas sensor, and (ii) replacing the fill level profile modeled by the first system model with the calculated fill level profile; and ascertaining the actual oxygen fill level of the exhaust gas component storage using the first system model which now models the calculated fill level profile;

wherein the calculating of the new fill level profile of the catalytic converter includes calculating the new fill level profile using a second system model; and wherein the second system model is an inverted system model having identical parameters and initially identical state variables as the first system model.

11. A control unit to regulate a filling of an exhaust gas component storage of a catalytic converter in the exhaust gas of an internal combustion engine, comprising:

a controller configured to ascertain an actual oxygen fill level of the exhaust gas component storage using a first system model, the catalytic converter being subdivided into zones situated one behind the other with respect to the exhaust gas flowing through the catalytic converter, each of the sub-zones having a respective oxygen fill level, the first system model modeling a fill level profile of the catalytic converter, the fill level profile including each of the respective oxygen fill levels of each of the sub-zones separately, the first system model being configured to process, to ascertain the actual oxygen fill level, signals of a first exhaust gas sensor which projects into the exhaust gas flow upstream from the catalytic converter and which detects a concentration of the exhaust gas component, and of a second exhaust gas sensor, which is situated downstream from the catalytic converter and is exposed to the exhaust gas, the controller further configured to predefine a base lambda setpoint value for a first control loop via a second control loop, and to adjust the actual oxygen fill level ascertained using the first system model when the voltage of the second exhaust gas sensor indicates a breakthrough of rich or lean exhaust gas downstream from the catalytic converter and an excessively low or excessively high actual oxygen fill level of the exhaust gas component storage;

wherein the controller adjusts the actual oxygen fill level ascertained using the first system model by (i) calculating a new fill level profile of the catalytic converter using the signal of the second exhaust gas sensor, and (ii) replacing the fill level profile modeled by the first system model with the calculated fill level profile, and wherein the controller is configured to ascertain the actual oxygen fill level of the exhaust gas component storage using the first system model which now models the calculated fill level profile;

wherein the calculating of the new fill level profile of the catalytic converter includes calculating the new fill level profile using a second system model; and wherein the second system model is a second forward system model having identical parameters and initially identical state variables as the first system model;

wherein the calculating of the new fill level profile of the catalytic converter includes calculating the new fill level profile using a second system model; and wherein the second system model is an inverted system model having identical parameters and initially identical state variables as the first system model.

* * * * *